Figure 1:
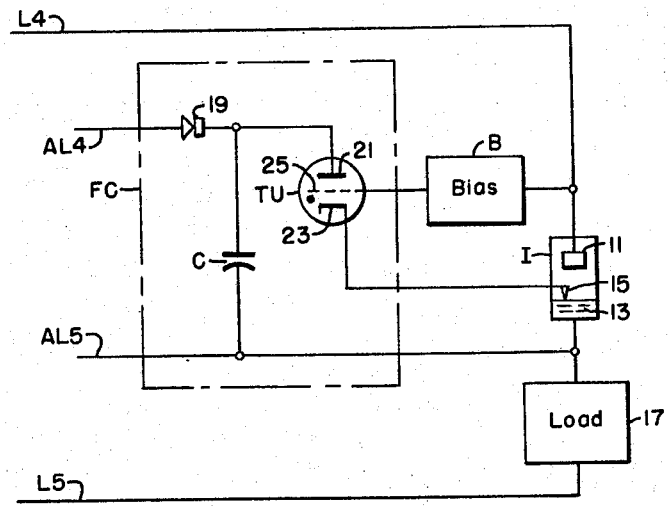

March 20, 1962     W. E. LARGE     3,026,450
ELECTRIC DISCHARGE APPARATUS
Filed Oct. 11, 1957     6 Sheets-Sheet 1

WITNESSES:
Bernard R. Gieguey
Leon J. Jaga

INVENTOR
William E. Large
BY
Hyman Diamond
ATTORNEY

March 20, 1962 W. E. LARGE 3,026,450
ELECTRIC DISCHARGE APPARATUS
Filed Oct. 11, 1957 6 Sheets-Sheet 3

United States Patent Office 3,026,450
Patented Mar. 20, 1962

3,026,450
ELECTRIC DISCHARGE APPARATUS
William E. Large, Clarence, N.Y., assignor to Westinghouse Electric Corporation, East Pittsburgh, Pa., a corporation of Pennsylvania
Filed Oct. 11, 1957, Ser. No. 689,672
12 Claims. (Cl. 315—171)

This application relates to electric discharge apparatus and has particular relation to motor-control apparatus.

The bodies of automobiles are formed in a press which is driven directly by a polyphase alternating-current motor. Th economics of the automotive industry requires that a large number of bodies be formed in a short time interval and this, in turn, imposes the demand that the motor driving the press be repeatedly started, stopped, and reversed. To achieve this object, the motor is supplied from a polyphase source through ignitrons which control the energization to the motor. During each starting operation, the ignitrons must be so controlled as to build up the current flowing through the motor gradually to the normal operating magnitude. Once this current is built up, it is desirable that the ignitrons supply the current corresponding to the normal operating power factor of the motor continuously until the motor is stopped.

In accordance with the prevailing practice in the art, each of the ignitrons through which the motor is supplied is provided with a so-called independent firing circuit which impresses firing potential in the igniter of the ignitron independently of the anode-cathode potential in this ignitron. Because the power factor of the motor varies as its load and the current through it varies and because the motor has a back electromotive force depending on its current and its load, the phase of the potential in the motor circuit cannot be reliably synchronized with the potential of the power supply, and thus the firing of the ignitrons from the independent firing circuit cannot be effectively synchronized so that the anode-cathode potential is at the firing magnitude when firing current is flowing through the igniter. In accordance with the teachings of the prior art, the failure to fire of the ignitrons because of improper relationship between the anode-cathode potential and the independent firing potential is avoided by reliance on so-called sustaining excitation. The ignitrons included in such prior art apparatus are of the type having auxiliary anodes which are supplied with potential independently of the load. When firing current is impressed on such an ignitron, a sustaining arc is first fired between the auxiliary anode and the cathode and this arc provides ionization permitting the firing of the arc between the main anode and the cathode when the main anode-cathode potential is adequate for firing.

This prior art apparatus suffers from a substantial cost disadvantage. Ignitrons with facilities for sustaining excitation have a substantially lower current rating then ignitrons not including such facilities and for any rating such prior art apparatus is thus costly because of the high cost of the ignitrons. In addition. this prior art apparatus, because it includes the sustaining auxiliary anode circuits, is complex and requires elaborate maintenance.

It is accordingly a specific object of this invention to provide drive apparatus for driving such a mechanism as an automobile body press of simpler structure and of lower cost than analogous prior art apparatus.

It is another specific object of this invention to provide such drive apparatus in which the driving component is a polyphase alternating-current motor which is supplied through ignitrons from a polyphase source.

It is broadly an object of this invention to provide apparatus of low cost and of relatively simple structure including independently fired ignitrons for controlling the supply of power from a polyphase source to a load.

An ancillary object of this invention is to provide a novel firing circuit for an ignitron.

Still another object of this invention is to provide control apparatus particularly suitable for controlling a motor which operates automatically to build up gradually the current supplied to the load to a predetermined magnitude and thereafter maintains the current at the said magnitude.

In accordance with this invention, in its specific aspects a polyphase motor is supplied from a polyphase source through ignitrons each of which is of the simple type controlled only by an igniter and not including facilities for sustaining excitation. Each of the ignitrons is provided with independent firing means but this means is controlled from the anode potential across the ignitron so that it only becomes effective to produce the firing impulse when the anode potential is of the proper polarity and magnitude to produce an arc.

Specifically, the independent firing circuit includes a capacitor which is periodically charged and which is connected to the igniter and the cathode of the ignitron through a firing thyratron. In the control circuit of this thyratron, the anode-cathode potential of the ignitron and a blocking bias are impressed. The bias is of sufficient magnitude to prevent conduction of the thyratron when the potential across the ignitron is equal to the arc drop between the anode and cathode of the ignitron during conduction, but is incapable of preventing conduction when the potential across the ignitron is equal to the open circuit potential existing when the ignitron is non-conducting. Thus, the thyratron can only conduct firing current through the igniter during the intervals during which the anode-cathode potential of the ignitron is positive, that is, during the intervals when the ignitron itself can conduct. The thyratron is incapable of conducting firing current through the ignitron during the intervals when the ignitron anode-cathode is negative and the ignitron is non-conducting and also, when the supply potential impressed between the anode and cathode of the ignitron is negative, but there is a carry-over conduction of the ignitron by reason of the inductive effect of the load being supplied. Thus the control of each ignitron is dependent on the anode-cathode potential of the ignitron in such a way that the supply of firing current can only take place when the anode-cathode potential is positive. The necessity for sustaining excitation is then entirely eliminated.

In the practice of this invention, the blocking bias may be of constant magnitude such that the ignitron is fired when its anode-cathode potential reaches a predetermined magnitude which is greater than the arc-drop across the ignitron when it is conducting. In accordance with the broader aspects of this invention the blocking bias may also be variable to vary the instants in the half periods of the supply when the ignitron is rendered fired. Where slope control of the wave front of the current conducted by the ignitrons is to be produced, the bias may be varied continuously during succeeding half-periods of positive anode-cathode potential impressed on the ignitron from a high magnitude to a low magnitude or from a low magnitude to a high magnitude to vary continuously the firing instants of the ignitron in accordance with the slope of the wave front which is desired.

Figure 2:
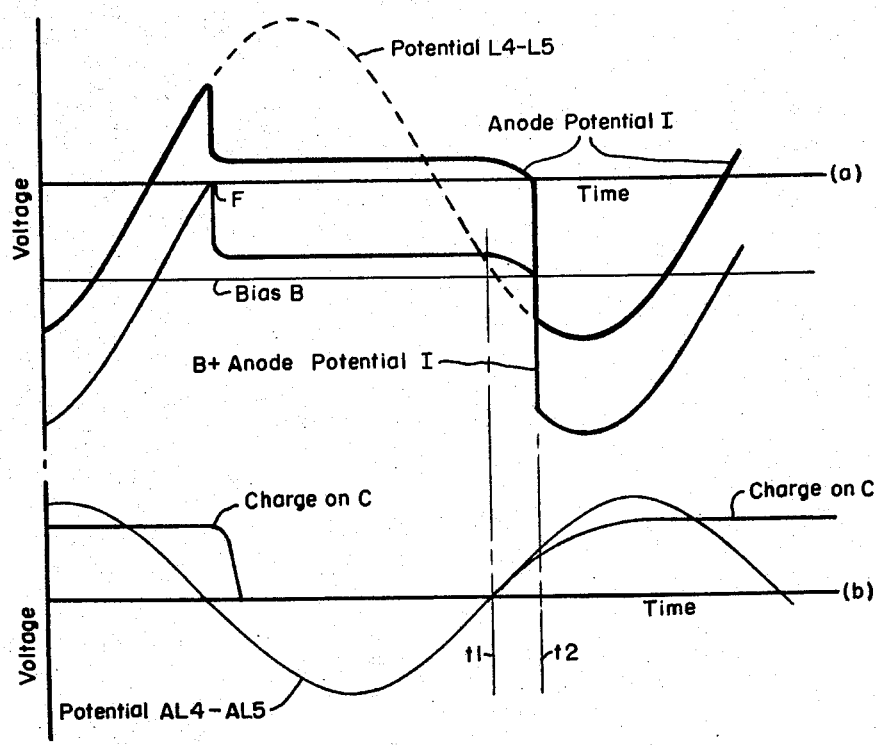
Figure 3A:
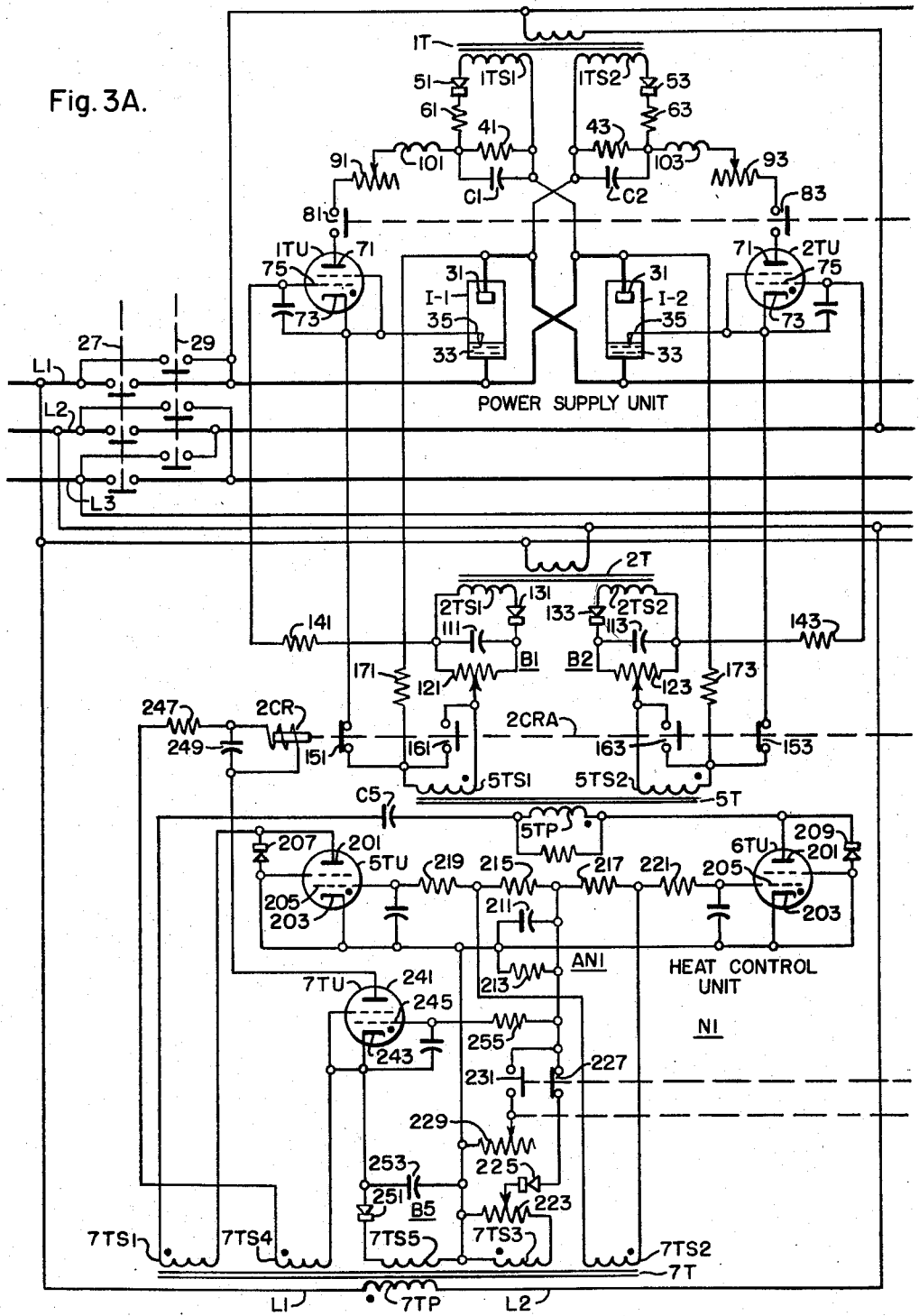
Figure 3B:
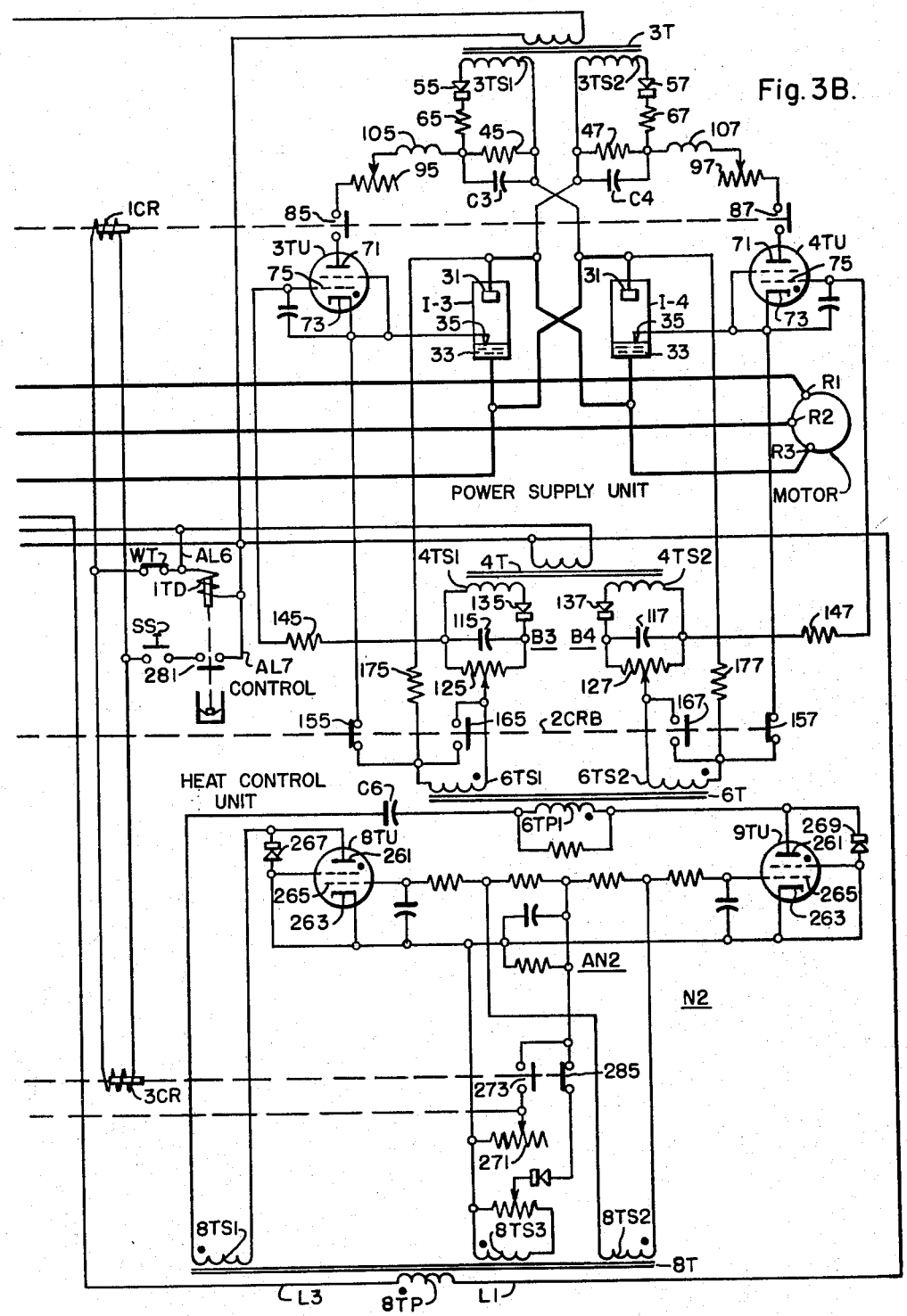
Figure 4A:
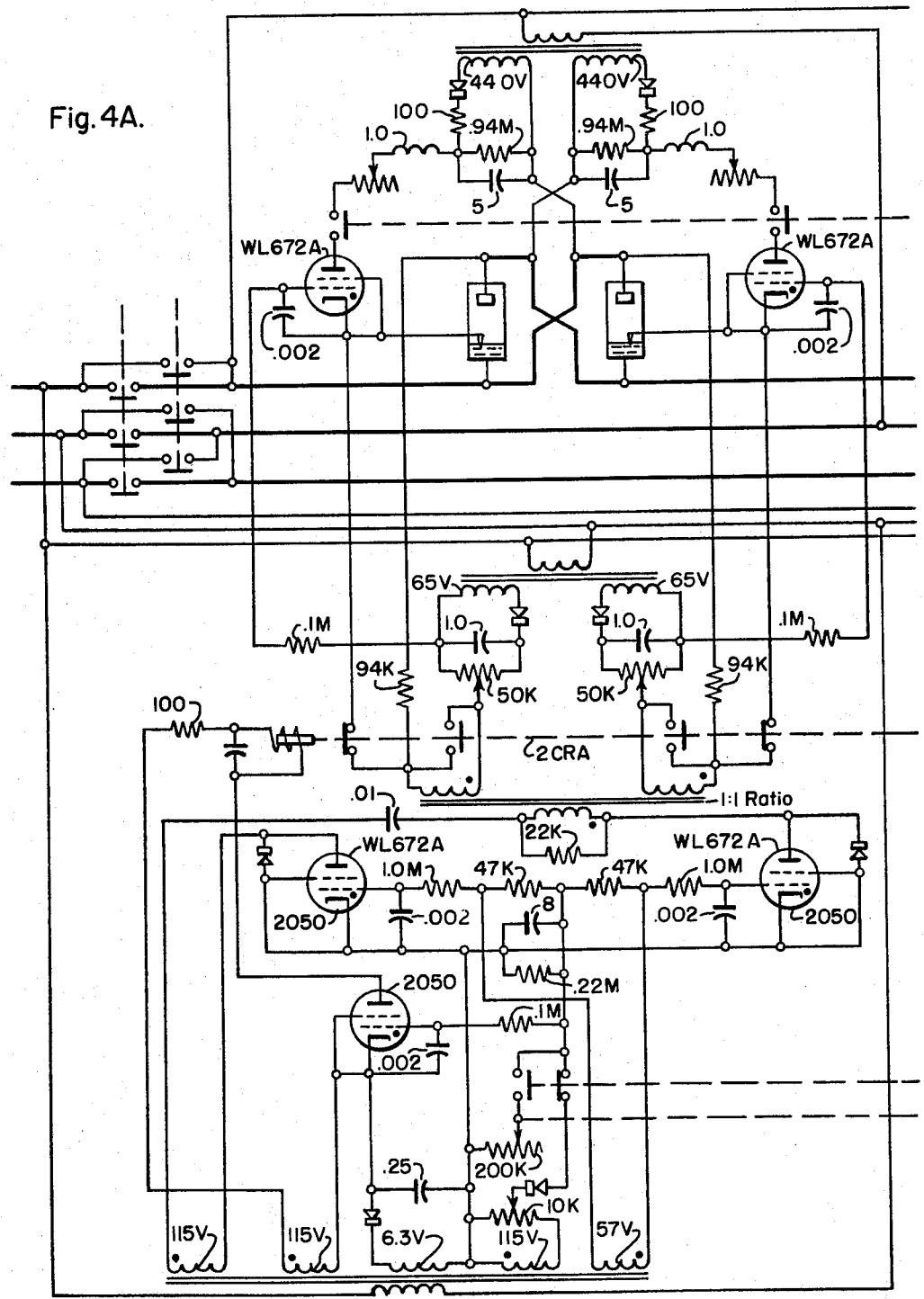
Figure 4B:
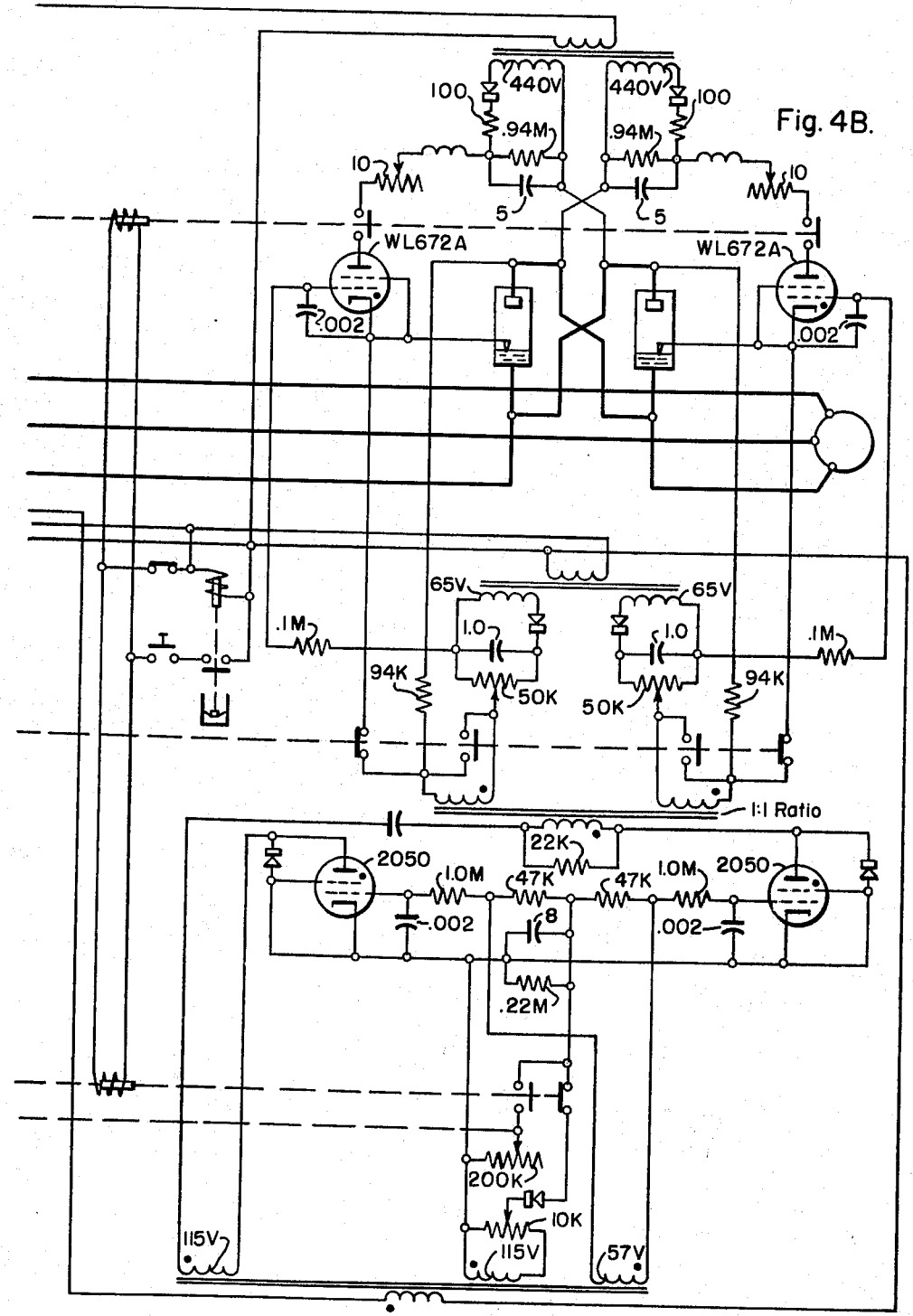
Figure 5:
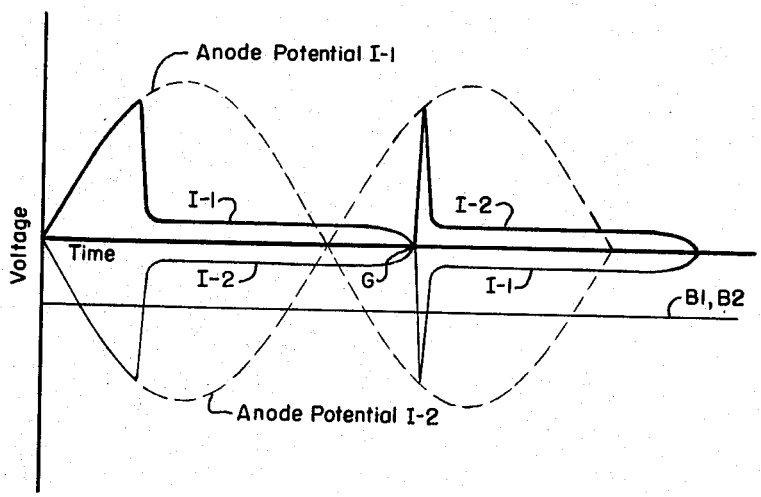

The novel features considered characteristic of this invention are disclosed generally above. The invention itself, both as to its organization and as to its method of operation, together with additional objects and advantages thereof, may be understood from the following description of a specific embodiment when read in connection with the accompanying drawings, in which:

FIGURE 1 is a circuit diagram of the basic ignitron firing circuit in accordance with this invention;
FIGURES 2A and 2B are graphs illustrating the operation of the apparatus shown in FIGURE 1;

FIGURES 3A and 3B together are a circuit diagram of a motor supply system in accordance with this invention;

FIGURES 4A and 4B together are a circuit diagram similar to FIGURES 3A and 3B but showing the magnitudes of components of a system which has been constructed and found to operate satisfactorily; and FIGURE 5 is a graph illustrating the operation of FIGURE 3.

FIGURES 4A and 4B are presented only for the purpose of aiding those skilled in the art in practicing this invention and not with any intention of limiting the scope of this invention.

The apparatus shown in FIGURE 1 includes an ignitron I having an anode 11, a cathode 13 and an igniter 15. This ignitron is preferably of the simple type not including an auxiliary anode, but this invention is also applicable to apparatus including an ignitron having an auxiliary anode which is maintained disconnected or shorted to the cathode. The ignitron is supplied from conductors L4 and L5 which may be connected to an alternating current commercial supply through the usual switches or disconnects (not shown) L4 is connected to the anode 11 and L5 to the cathode 13 through a load 17.

For firing the ignitron I an independent firing circuit FC is provided. A typical independent firing circuit includes a firing capacitor C adapted to be charged from alternating-current conductors AL4 and AL5 through a rectifier 19.

In addition, there is a firing thyratron TU having an anode 21, a cathode 23 and a control electrode 25. The anode 21 of the thyratron TU is connected to the plate of the firing capacitor C which is charged positive. The cathode 23 is connected to the igniter 15. The cathode 13 of the ignitron is connected to the plate of the firing capacitor C which is charged negative. Thus, when the thyratron TU is conducting, the capacitor C is discharged and current flows through the thyratron TU, the igniter 15 and the cathode 13 to fire the ignitron I.

The potential between conductors AL4 and AL5 may be displaced in phase with reference to the potential between the anode 11 and cathode 13 of the ignitron I either by reason of the inductive effect of the load or because there is a phase-shift network interposed between conductors L4 and L5 and conductors AL4 and AL5. It is then necessary to assure that when the firing capacitor is being discharged the anode-cathode potential of the ignitron is of the proper polarity and magnitude for firing and for this purpose, the control circuit of the thyratron TU includes as a component, the anode-cathode potential of the ignitron. This control circuit extends from the control electrode 25 through a bias B, the anode 11 and cathode 13 of the ignitron, the igniter 15 to the cathode 23 of the thyratron TU. The polarity of the bias B is such that it tends to block the conduction of the thyratron and its minimum magnitude is such that it is effective in blocking the conduction of the thyratron TU when the anode-cathode potential of the ignitron is not greater than the arc drop across the ignitron I while conducting. Thus, so long as the ignitron I conducts, regardless of the polarity of its supply potential, the thyratron TU is incapable of conducting and of supplying firing current to the ignitron.

The bias B could be variable and if so variation of the blocking bias could conform with the desired pattern of conduction of the ignitron. If, for example, the conductivity of the ignitron is to increase from a low magnitude to a high magnitude during a predetermined interval, a variable bais could be continuously varied during this interval from a corresponding high magnitude at which the ignitron would be rendered conducting late in the periods of the supply to a low magnitude for which the ignitron I would be rendered conducting early in the periods of the supply.

The operation of the apparatus shown in FIG. 1 is illustrated in FIGS. 2A and 2B. In each of these, voltage is plotted vertically and time horizontally.

In FIG. 2A, the anode potential impressed on the ignitron I during a typical operation is represented by the heavy full line curve and, the blocking bias B is represented by the light, full line curve below the axis of abscissae. The net control potential for the thyratron TU is equal to the algebraic sum of the anode potential across the ignitron I and the blocking bias B and is represented by the medium weight full line curve. For practical purposes, it may be assumed that the firing thyratron TU is fired when the net control potential passes through the zero magnitude (point F). It is seen that this event can only occur when the anode-cathode potential impressed on the ignitron I is positive.

In FIG. 2B, the potential impressed on the firing capacitor C is plotted as a function of time. It is assumed that the potential across conductors AL4 and AL5 which supplies the charge on the capacitor C is displaced in phase with reference to the potential of conductors L4 and L5 and that the capacitor is charged during the positive half periods of this potential. Positive potential may then exist on the firing thyratron during intervals when the ignitron is still conducting, for example, between the intervals t1 and t2 of FIG. 2B. In the absence of the blocking bias, the firing thyratron TU would be rendered conducting sometime between the intervals t1 and t2 and once rendered conducting would continue to conduct during the interval when the potential supplying the firing capacitor C is positive, preventing the recharging of the firing capacitor C. When subsequently the ignitron would become non-conducting and its anode-cathode potential would become positive, there would be no charge on the firing capacitor to again render the ignitron conducting. Thus the blocking bias B performs the important function of suppressing improper conduction of the firing thyratron which might result from the inductive effect of the load.

*DESCRIPTION—FIGURES 3A AND 3B*

The apparatus shown in FIGS. 3A and 3B includes a Motor, a Power Supply Unit for the Motor, a Heat Control Unit for controlling the current conducted by the Power Supply Unit and a Control. This apparatus is supplied from conductors L1, L2, L3 which are adapted to be connected to the usual buses of a commercial polyphase supply through disconnects or circuit breakers (not shown). So that the direction of rotation of the Motor may be controlled, the conductors L1, L2, L3 are adapted to be connected to the Power Supply Unit selectively through the contacts 27 or 29 of a forward or reverse contactor (coil not shown).

The Motor is of the polyphase alternating-current type having input terminals R1, R2 and R3. The Motor may be of any suitable type having either a squirrel-cage or a wound rotor.

The Power Supply Unit includes a plurality of ignitrons I-1, I-2, I-3 and I-4. Each of the ignitrons has an anode 31, a cathode 33 and an igniter 35. Conductor L1 is adapted to be connected to terminal R1 through the anodes 31 and the cathodes 33 of ignitrons I-1 and I-2 connected in anti-parallel and through the contacts 27 or 29 of the forward or reverse contactor depending on the desired direction of rotation of the Motor. Conductor L3 is adapted to be connected to terminal R3 of the Motor through the anodes 31 and cathodes 33 of the ignitrons I-3 and I-4 connected in anti-parallel and forward or reverse contacts 27 or 29. Conductor L2 is adapted to be directly connected to terminal R2 through contacts 27 or 29.

An independent firing circuit is associated with each ignitron. These circuits are supplied respectively from secondaries 1TS1 and 1TS2, of transformer 1T and 3TS1 and 3TS2 of transformer 3T. Each circuit includes a capacitor C1, C2, C3, C4 shunted by a bleeder resistor 41, 43, 45, 47. Each capacitor C1, C2, C3, C4 is connected to be charged from the associated secondary 1TS1, 1TS2, 3TS1, 3TS2 through a rectifier 51, 53, 55 and 57 and a low ohmic resistor 61, 63, 65, 67. Each firing circuit also includes a thyratron 1TU, 2TU, 3TU and 4TU, respectively, each thyratron having an anode 71, a cathode 73 and a control electrode 75. The anode 71 of each thyratron is adapted to be connected to the plate of the firing capacitor C1 through C4 which is charged positively through the normally open contact 81, 83, 85, 87 of a relay 1CR in the Control through a variable resistor 91, 93, 95, 97 of low ohmic resistance and through an inductor 101, 103, 105, 107 which converts any discharge current of the capacitor C1 through C4 to peak wave form. The cathode 73 of each thyratron 1TU through 4TU is connected to the igniter 35 of the associated ignitron I-1 through I-4. The firing circuit is completed from the cathode 33 of the ignitron I-1 through I-4 to the plate of the capacitor C1 through C4 which is charged negative.

The control circuit of each of the firing thyratrons 1TU through 4TU includes a biasing network B1, B2, B3 and B4, which are energized respectively from secondaries 2TS1 and 2TS2 of transformer 2T and secondaries 4TS1 and 4TS2 of transformer 4T. Each network B1 through B4 includes a capacitor 111, 113, 115, 117 shunted by a variable resistor 121, 123, 125, 127. Each resistor 121 through 127 is set to set each bias to correspond the arc drop of the associated ignitron. Each capacitor 111 through 117 is charged from the associated secondary 2TS1 through 4TS2 through a rectifier 131, 133, 135, 137.

Each thyratron 1TU through 4TU has two control circuits depending on the condition of relays 2CRA and 2CRB (coil of 2CRB not shown) in the Heat Control Unit. One of these circuits for thyratron 1TU extends from the control electrode 75 through a grid resistor 141, the bias network B1, the secondary 5TS1 of an output transformer 5T of the Heat Control Unit, a normally closed contact 151 of the relay 2CRA to the cathode 73 of the thyratron 1TU. The other circuit extends from the control electrode 75 through the grid resistor 141, the bias B1, a normally-open contact 161 of the relay 2CRA, a resistor 171, the anode 31 of the ignitron I-1, the igniter 35 and cathode 33 of the ignitron I-1 to the cathode 73 of the thyratron 1TU.

The latter circuit includes the anode-cathode potential of the ignitron I-1 in series with the bias B1. The bias B1 is of such magnitude as to maintain the thyratron 1TU non-conducting so long as the anode-cathode potential across ignitron I-1 does not exceed the arc drop across the ignitron I-1 while conducting.

The control circuits of thyratron 2TU are similar to that of thyratron 1TU, including grid resistor 143, the bias network B2, secondary 5TS2 of the Heat Control Unit and corresponding normally closed and normally open contacts 153 and 163 of relay 2CRA and a resistor 73. Similarly, the control circuits of thyratrons 3TU and 4TU include grid resistors 145 and 147, bias networks B3 and B4, respectively, secondaries 6TS1 and 6TS2 of transformer 6T of the Heat Control Unit, corresponding normally closed and open contacts 155, 157 and 165 and 167 of relay 2CR and resistors 175 and 177.

The Heat Control Unit includes two similar networks N1 and N2, N1 controlling ignitrons I-1 and I-2 and N2 controlling ignitrons I-3 and I-4. Network N1 also includes a timing unit for controlling the relays 2CRA and 2CRB.

Network N1 includes a pair of thyratrons 5TU and 6TU each having an anode 201, a cathode 203 and a control electrode 205. The anodes 201 and cathodes 203 of each of the thyratrons 5TU and 6TU are shunted by a rectifier 207 and 209 respectively capable of conducting oppositely to the associated thyratron. Network N1 also includes a heat control capacitor C5.

Power is supplied to network N1 by a transformer 7T, the primary 7TP of which is supplied from conductors L1 and L2 anode-cathode potential is supplied into the thyratrons 5TU and 6TU through secondary 7TS1. Capacitor C5 is connected to be charged to one polarity in a circuit extending from one terminal of the secondary 7TS1 through the anode 201 and cathode 203 of thyratron 5TU, the rectifier 209 across thyratron 6TU, the primary 5TP of transformer 5T, the capacitor C5 to the other terminal of the secondary 7TS1. The capacitor C5 is connected to be charged to the opposite polarity in a circuit extending from the last-mentioned terminal of the secondary 7TS1 through the capacitor C5, the primary 5TP of transformer 5T, the anode 201 and cathode 203 of thyratron 6TU, the rectifier 207 across thyratron 5TU to the first-mentioned terminal of secondary 7TS1. Thyratrons 5TU and 6TU are controlled by a network AN1 and a secondary 7TS2 of the transformer 7T. The network AN1 includes a capacitor 211 shunted by a resistor 213 and a variable resistor 229 for discharging the network which is adapted to be connected in shunt with the capacitor 211 through normally open contact 231 of relay 3CR. The secondary 7TS2 is loaded by a pair of resistors 215 and 217. The control circuit for thyratron 5TU extends from the control electorde 205 through a grid resistor 219, the secondary 7TS2, one of the loading resistors 217, the network AN1 to the cathode 203 of the thyratron. The control circuit for thyratron 6TU extends from the control electrode 205 through a grid resistor 221, the secondary 7TS2, the loading resistor 215, the network AN1 to the cathode 203. The network AN1 is adapted to be charged from a third secondary 7TS3 of the transformer 7T through a variable resistor 223 connected across the secondary, through a rectifier 225 and through a normally closed contact 227 of the relay 3SR in the Control.

The timing unit included in network N1 includes a thyratron 7TU having an anode 241, a cathode 243 and a control electrode 245. The anode 241 of this thyratron is connected to one terminal of secondary 7TS4 through the coils of relays 2CRA and 2CRB (coil of 2CRB not shown) in parallel and a resistor 247. These coils are shunted by a capacitor 249 so that they do not chatter. The cathode 243 of thyratron 7TU is directly connected to the other terminal of 7TS4.

The control circuit of thyratron 7TU includes network AN1 and a biasing network B5. Network B5 is supplied from another secondary 7TS5 (which may also supply the heater of 7TU) and includes a rectifier 251 and a capacitor 253. The control circuit of 7TU extends from the control electrode 245 through a grid resistor 255, network AN1, network B5 to the cathode 243. The network AN1 is so connected in this control circuit as to tend to maintain 7TU non-conducting. Network B5 tends to counteract the potential of network AN1. The relationship between these potentials is such that with network AN1 fully charged, thyratron 7TU is non-conducting, and when the network has discharged for a predetermined time interval through the normally open contact 231 of relay 3CR and the variable resistor 229, thyratron 7TU is rendered conducting.

Network N2 is similar to network N1 including thyratrons 8TU and 9TU, each having an anode 261, a cathode 263 and a control electrode 265 and each shunted by a rectifier 267 and 269 respectively poled to conduct oppositely to the associated thyratron. The network N2 also includes a capacitor C6 analogous to the capacitor C5 of network AN1 and a time-constant network AN2 analogous to the network AN1. The network AN2 includes a discharging variable resistor 271 which may be connected in discharging relationship through a normally open contact 273 of relay 3CR. The adjusting arms of resistors 229 and 271 are gauged. The network N2 of the Heat Control Unit is energized from transformer 8T, the primary 8TP of which is connected between conductors L1 and L3. The anodes 261 and cathodes 263 of the thyratrons 8TU and 9TU, the capacitor C5, the network AN2, and the secondaries 8TS1, 8TS2 and 8TS3 are connected similarly to the corresponding components of the network N1.

The Control includes in addition to the relays 1CR and 3CR a time delay relay 1TD having a normally open contact. This relay 1TD is energized when power is applied to the apparatus and affords time for the cathodes of the various thyratrons to reach an adequate temperature for emission before the apparatus can be operated. The Control is supplied from conductors AL6 and AL7 which may derive these powers from any two of the conductors L1, L2, L3. The coils of the relays 1CR and 3CR are adapted to be connected in parallel between the conductors AL6 and AL7 through the normally open contacts 281 of relay 1TD, a start switch SS, and thermal elements which respond to the temperature of the cooling water for the ignitrons. The coil of relay 1TD is connected between conductors AL6 and AL7.

Stand-By

In the stand-by condition of the apparatus, conductors L1, L2 and L3 are energized. Transformers 2T, 4T, 7T and 8T are then also energized. The biasing networks B1, B2, B3, and B4 are energized from transformers 2T and 4T. The conductors AL6 and AL7 supplying the Control are also energized, energizing time delay relay 1TD which ultimately closes its contact 281. The start switch SS is open so that relays 1CR and 3CR are deenergized. The contacts of relay 1CR being open, the anode circuits of the firing thyratrons 1TU through 4TU are open and these are incapable of conducting. Since transformer 7T is energized, network AN1 is charged through the normally closed contact 227 of relay 3CR, the charge on the network blocks conduction of thyratron 5TU, 6TU and 7TU. Similarly, the conduction of thyratrons 8TU and 9TU is prevented. Transformers 5T and 6T are then deenergized. At this time, the contacts 27 and 29 of the forward and reverse contactors are open so that there is no anode potential supplied to the ignitrons I-1 through I-4 and to transformers 1T and 3T.

Operation

Preliminary to an operation, the forward or reverse contactors 27 or 29 corresponding to the direction of rotation of the Motor desired is actuated, closing the contacts. It may be assumed that the forward contacts 27 are closed. Anode potential is then applied to the ignitrons I-1 through I-4 and terminal R2 of the Motor is energized. In addition, transformers 1T and 3T are energized from conductors L1 and L2 and transformer 3T from conductors L2 and L3.

Initially, anode potential is applied to ignitrons I-1 and I-2 from conductors L1 and L2 through the windings of the Motor connected to terminals R1 and R2. Secondaries 1TS1 and 1TS2 are so wound that their potential is respectively in opposite phase to the anode-cathode potentials impressed on ignitrons I-1 and I-2 so that the associated firing capacitors C1 and C2 are charged during the half-periods when the anode-cathode potentials on I-1 and I-2 are negative. Ignitrons I-3 and I-4 are supplied with anode potential from conductors L3 and L2 through corresponding windings of the Motor. Secondaries 3TS1 and 3TS2 are wound analogous to secondaries 1TS1 and 1TS2 so that the associated firing capacitors are charged during the half-periods during which the anode-cathode potentials on ignitrons I-3 and I-4 are negative.

With the start switch SS open and relays 3CR and 1CR deenergized, blocking bias is impressed on the firing thyratrons 1TU through 4TU through the associated quiescent secondaries 5TS1, 5TS2, 6TS1 and 6TS2 from the biasing networks B1 through B4, so that initially they are incapable of conducting even when the contacts 81, 83, 85, 87 of relay 1CR are closed.

The operation is started by the closing of the start switch. This energizes relays 1CR and 3CR. The actuation of relay 1CR closes the contacts 81, 83, 85, 87 in series with the firing thyratrons 1TU through 4TU closing the anode circuits of these thyratrons. At this time, the thyratrons are maintained non-conducting because of the blocking bias B1 through B4 in their control circuits. The actuation of relay 3CR opens the normally closed contacts 227 and 228 of this relay and closes the normally open contacts 231 and 273 interrupting the charging of networks AN1 and AN2 and permitting the networks to discharge through their associated timing resistors 229 and 271.

While network AN1 is discharging, thyratrons 7TU remains non-conducting and relays 2CRA and 2CRB remain deenergized. Thyratrons 5TU, 6TU, 8TU and 9TU are controlled from the combined potentials of the networks AN1 and AN2, respectively, and the secondaries 7TS2 and 8TS2 respectively. The potentials are so related that initially thyratrons 5TU and 6TU are rendered conducting late in the half periods of the potential supplied by secondary 7TS1 and thyratrons 8TU and 9TU are rendered conducting late in the half periods supplied by the secondary 8TS1. The conduction of 8TU and 9TU causes pulses of opposite polarity to flow through the primary 6TP. The pulses transmitted through the primary 5TP and 6TP induce corresponding pulses in the secondaries 5TS1, 5TS2, 6TS1 and 6TS2 and these are capable of rendering conducting the thyratrons 1TU through 4TU to discharge the firing capacitors. When thyratrons 1TU through 4TU are rendered conducting, they discharge the firing capacitors transmitting firing current through the ignitrons I-1 through I-4, respectively, rendering the latter conducting at the instants when the discharges occur. As the conduction of thyratrons 5TU and 6TU, 8TU and 9TU continues, the ignitrons I-4 and I-4 are rendered conducting and polyphase current is supplied to the Motor so that the rotation of the Motor is started. Initially, when networks AN1 and AN2 are charged to a high potential only the peaks of the waves impressed through 7TS2 and 8TS2 are effective in firing 5TU and 6TU and 8TU and 9TU so that these thyratrons are fired late in the corresponding half periods. As the conduction proceeds, networks AN1 and AN2 are discharging and as they discharge 5TU and 6TU and 8TU and 9TU are rendered conducting progressively earlier in the corresponding periods of the potential from secondaries 7TS1 and 8TS1. The relationship of the phases of the secondaries 7TS1 and 8TS1 and the anode-cathode potentials of the ignitrons I-1 through I-4 is such that the ignitrons are rendered conducting earlier and earlier in the half periods of the supply as the Motor picks up speed.

When the network AN1 is discharged to a predetermined potential, thyratron 7TU is rendered conducting, energizing relays 2CRA and 2CRB. The normally closed contacts 151, 153, 155, 157 of these relays open and the normally open contacts 161, 163, 165, 167 of these relays close. The secondaries 5TS1, 5TS2 and 6TS1, 6TS2 are now disconnected from the control circuits of the thyratrons 1TU through 4TU and these thyratrons are now controlled from the anode potential across the associated ignitrons I-1 through I-4 respectively, and the blocking biases B1 through B4, respectively. The ignitrons are now rendered conducting when their anode potential is of proper magnitude with reference to the associated blocking bias B1 through B4. With the blocking biases B1 through B4 set to exceed the arc drops across the ignitrons I-1 through I-4 but not the anode voltage at normal operating power factors each ignitron will start to conduct in its turn at an angle in the corresponding positive half periods of anode-cathode potential which angle corresponds to the power factor of the load. The operation in this manner continues until the start switch SS is opened so that the Motor may be stopped.

FIGURE 5 is a graph illustrating the operation of the apparatus shown in FIGURE 3. In FIGURE 5 anode potential for I–1 and I–2 is plotted vertically and time horizontally. The heavy full-line curves represent the anode potentials of ignitrons I–1 and I–2 respectively when they are conducting; the lighter full-line curves represents the anode potential for an ignitron I–1 or I–2 which is not conducting. It is seen that I–1 conducts during the first half period and the first part of the second and as soon as I–1 stops conducting (point G) the anode potential of I–2 rises to the open circuit magnitude. At this magnitude B–2 is exceeded so that I–2 at once starts to conduct. If the power factor should change the point G would shift and the instant of conduction of I–2 (and I–1 during a third half period) would change correspondingly. Thus there is automatic power-factor operation.

CONCLUSION

The apparatus disclosed herein includes not only a novel ignitron firing circuit but also a novel motor control circuit in which simple ignitrons, sans auxiliary anodes and their associated circuits, may be used. In practice, this apparatus has been found to operate highly satisfactory.

While a preferred embodiment of this invention has been disclosed herein, many modifications thereof are feasible. This invention then is not to be restricted except insofar as is necessitated by the spirit of the prior art.

I claim as my invention:

1. In combination conductors for impressing an alternating potential, an electric discharge device of the immersed ignition electrode type having an anode, a cathode and an igniter, a firing valve for said device having an anode, a cathode and a control electrode, a source of anode-cathode potential for said valve the magnitude of which is maintained independently of said alternating potential, means connecting in series said source, said anode and cathode of said valve, said igniter and said cathode of said device, biasing potential supply means, and means connecting in a series circuit, said control electrode, said supply means, said anode and said cathode of said device and said cathode of said valve, said supply means impressing in said circuit a biasing potential tending to maintain said valve non-conducting, said biasing potential exceeding the arc-drop potential across said device while said device is conducting.

2. Apparatus for supplying power from an alternating current source having supply conductors to a motor comprising in combination at least one ignitron having an anode, a cathode and an igniter, means connected to said anode and cathode for connecting in series said conductors, said anode, said cathode and said motor, a firing valve for said ignitron having an anode, a cathode and a control electrode, a capacitor, means connected to said conductors for charging said capacitor to a predetermined direct-current potential, means connecting in series said capacitor, said anode and cathode of said firing valve, said igniter and said cathode of said ignitron, biasing potential supply means, and means connecting in series circuit said control electrode, said biasing potential, said anode and cathode of said ignitron and said cathode of said valve, said supply means impressing in said circuit a bias potential such as to tend to maintain said valve non-conducting, said bias potential exceeding the arc-drop potential across said ignitron while said ignitron is conducting.

3. In combination an ignitron having an anode, a cathode and an igniter, a firing valve for said ignitron having an anode, a cathode and a control electrode, means connected to said anode and cathode of said ignitron for supplying alternating-current potential thereto, means connected to said anode and cathode of said valve and to said igniter for supplying potential to said last-named anode and cathode through said igniter, said last-named potential being independent of said alternating-current potential, a heat control unit including an output winding through which potential pulses are supplied at predetermined instants in the periods of said alternating current, biasing potential supply means, first switch means, second switch means, means including said first switch means for connecting in a first series circuit said control electrode, said biasing potential supply means, said winding and said cathode of said valve, means including said second switch means for connecting in a second series circuit said control electrode, said biasing potential supply means, said anode and cathode of said ignitron and said cathode of said valve, and means for maintaining either of said switch means open and the other closed, said supply means supplying a bias potential in said first and second circuits which tends to maintain said valve non-conducting, and which exceeds the arc-drop potential between said anode and cathode of said ignitron while said ignitron is conducting and which is exceeded by said potential pulses.

4. In combination an ignitron having an anode, a cathode and an igniter, a firing valve for said ignitron having an anode, a cathode and a control electrode, means connected to said anode and cathode of said ignitron for supplying alternating-current potential thereto, means connected to said anode and cathode of said valve and to said igniter for supplying potential to said last-named anode and cathode through said igniter, said last-named potential being independent of said alternating-current potential, a heat control unit including an output winding through which potential pulses are supplied at predetermined instants in the periods of said alternating current, biasing potential supply means, first switch means, second switch means, means including said first switch means for connecting in a first series circuit said control electrode, said biasing potential supply means, said winding and said cathode of said valve, means including said second switch means for connecting in a second series circuit said control electrode, said biasing potential supply means, said anode and cathode of said ignitron and said cathode of said valve, said first switch means being normally maintained closed and said second switch means open, and timing when actuated opening said first switch means and closing said second switch means after a predetermined time interval, said supply means supplying a bias potential in said first and second circuits which tends to maintain said valve non-conducting, and which exceeds the arc-drop potential between said anode and cathode of said ignitrons while said ignitron is conducting and which is exceeded by said potential pulses.

5. Apparatus for controlling the supply of power from an alternating-current source to a motor comprising in combination at least one ignitron connected between said source and said motor to control the current from said source to said motor, said ignitron having an anode, a cathode and an igniter, ignitron firing means independent of said source connected to said igniter and cathode for supplying firing current therethrough, said firing means including a firing valve having an anode and a cathode through which said firing current flows and a control electrode, and control circuit means connecting said control electrode and cathode of said valve to said anode and cathode of said ignitron to control the conductivity of said valve in accordance with the anode-cathode potential of said ignitron, said control circuit means tending to render said valve conducting during the intervals when said anode-cathode potential of said ignitron is electrically positive, said control circuit means including biasing means maintaining said valve non-conducting when said anode-cathode potential of said ignitron is no greater than the arc-drop potential across said ignitron but permitting said valve to conduct when said anode-cathode potential is higher than said arc-drop potential.

6. Apparatus for controlling the supply of power from an alternating-current source to a motor comprising in combination at least one ignitron connected between said source and said motor to control the current from said source to said motor, said ignitron having an anode, a cathode and an igniter, ignitron firing means independent of said source connected to said igniter and cathode for supplying firing current therethrough, said firing means including a firing valve having an anode and a cathode through which said firing current flows and a control electrode, and control circuit means connecting said control electrode and cathode of said valve to said anode and cathode of said ignitron to control the conductivity of said valve in accordance with the anode-cathode potential of said ignitron, said control circuit means including blocking bias means preventing said valve from conducting so long as said anode-cathode potential is no greater than the arc drop potential across said ignitron and permitting said valve to conduct when said anode-cathode potential is higher than said arc-drop potential.

7. In combination conductors for supplying alternating current, at least one ignitron connected to said conductors to control the current supplied thereby, said ignitron having an anode, a cathode and an igniter, ignitron firing means independent of said alternating current connected to said igniter and cathode for supplying firing current therethrough, said firing means including a firing valve having an anode and a cathode through which said firing current flows and a control electrode, and control circuit means connecting said control electrode and cathode of said valve to said anode and cathode of said ignitron to control the conductivity of said valve in accordance with the anode-cathode potential of said ignitron, said control circuit means including blocking bias means preventing said valve from conducting so long as said anode-cathode potential is no greater than the arc drop potential across said ignitron and permitting said valve to conduct when said anode-cathode potential is higher than said arc-drop potential.

8. In combination conductors for supplying alternating current, at least one ignitron connected to said conductors to control the current supplied thereby, said ignitron having an anode, a cathode and an igniter, ignitron firing means independent of said alternating current connected to said igniter and cathode for supplying firing current therethrough, said firing means including a firing valve having an anode and a cathode through which said firing current flows and a control electrode, and control circuit means connecting said control electrode and cathode of said valve to said anode and cathode of said ignitron to control the conductivity of said valve in accordance with the anode-cathode potential of said ignitron, said control circuit means including blocking bias means preventing said valve from conducting so long as said anode-cathode potential is no greater than the arc-drop potential across said ignitron and permitting said valve to conduct when said anode-cathode potential is higher than said arc-drop potential, said blocking bias means including means for varying the magnitude of the bias to vary the instants in the intervals during which said anode-cathode potential is higher than said arc-drop potential when said valve is rendered conducting.

9. In combination first, second and third conductors for supplying a polyphase potential, a polyphase motor having first, second and third supply terminals, a first ignitron, a second ignitron, a third ignitron, a fourth ignitron, each of said ignitrons having an anode, a cathode and an igniter, means connecting said anodes and cathodes of said first and second ignitrons in anti-parallel between said first conductor and said first terminal, means connecting said anodes and cathodes of said third and fourth ignitrons in anti-parallel between said second conductor and said second terminal, means connecting said third conductor directly to said third terminal, a firing means independent of said polyphase potential for each of said ignitrons, each of said firing means including a firing valve having an anode, a cathode and a control electrode, means connecting each said firing means to said igniter and cathode of its associated ignitron, said connecting means including means connecting the anode and cathode of the valve of said last-named firing means to conduct firing current through said last-named igniter and cathode, and a control circuit means for each firing valve connected to the anode and cathode of the associated ignitron for controlling the conductivity of said last-named firing valve in accordance with the anode-cathode potential of said last-named ignitron, said control circuit means including blocking bias means preventing the conduction of said last-named valve when said anode-cathode potential is no greater than the arc-drop potential of said last-named ignitron and permitting conduction when said anode-cathode potential is greater than said arc-drop potential.

10. Apparatus for controlling the supply of power from a polyphase source having first, second and third conductors to a polyphase motor having first, second and third supply terminals comprising a first ignitron, a second ignitron, a third ignitron, a fourth ignitron, each of said ignitrons having an anode, a cathode and an igniter, means connected to said anodes and cathodes of said first and second ignitrons for connecting said anodes and cathodes of said first and second ignitrons in anti-parallel between said first conductor and said first terminal, means connected to said anodes and cathodes of said third and fourth ignitrons for connecting said anodes and cathodes of said third and fourth ignitrons in anti-parallel between said second conductor and said second terminal, means for connecting said third conductor directly to said third terminal, a firing means independent of said polyphase potential for each of said ignitrons, each of said firing means including a firing valve having an anode, a cathode and a control electrode, means connecting each said firing means to said igniter and cathode of its associated ignitron, said connecting means including means connecting the anode and cathode of the valve of said last-named firing means to conduct firing current through said last-named igniter and cathode, and a control circuit means for each firing valve connected to the anode and cathode of the associated ignitron for controlling the conductivity of said last-named firing valve in accordance with the anode-cathode potential of said last-named ignitrons, said control circuit means including blocking bias means preventing the conduction of said last-named valve when said anode-cathode potential is no greater than the arc-drop potential of said last-named ignitron and permitting conduction when said anode-cathode potential is greater than said arc-drop potential.

11. In combination conductors for impressing an alternating potential, an electric discharge device of the immersed ignition-electrode type having an anode, a cathode and an igniter, a firing valve for said device having an anode, a cathode and a control electrode, a source of anode-cathode potential for said valve, means connecting in series said source, said anode and cathode of said valve, said igniter and said cathode of said device, biasing potential supply means, and means connecting in a series circuit, said control electrode, said supply means, said anode and said cathode of said device and said cathode of said valve, said supply means impressing in said circuit a biasing potential tending to maintain said valve non-conducting, said biasing potential exceeding the arc-drop potential across said device while said device is conducting.

12. In combination an electric discharge device of the immersed ignition-electrode type having an anode, a cathode and an igniter, a firing valve for said device having an anode, a cathode and a control electrode, a source of anode-cathode potential for said valve, means connecting in series said source, said anode and cathode of said valve and said igniter and cathode of said device, biasing potential supply means, and means connecting in a series circuit said control electrode and cathode of said valve, said supply means, and said anode and cathode of said device, said supply means impressing in said circuit a biasing potential tending to maintain said valve non-conducting.

References Cited in the file of this patent

UNITED STATES PATENTS

| | | |
|---|---|---|
| 2,201,873 | Verse | May 21, 1940 |
| 2,270,601 | Overbeck | Jan. 20, 1942 |
| 2,494,747 | Drugmand | Jan. 17, 1950 |
| 2,495,165 | Fulmer | Jan. 17, 1950 |
| 2,520,478 | Standback et al. | Aug. 29, 1950 |
| 2,535,499 | Lexa | Dec. 26, 1950 |
| 2,663,834 | Large et al. | Dec. 22, 1953 |
| 2,703,860 | Large et al. | Mar. 8, 1955 |
| 2,730,659 | Hess | Jan. 10, 1956 |
| 2,771,574 | Wetter | Nov. 20, 1956 |

FOREIGN PATENTS

| | | |
|---|---|---|
| 621,466 | Great Britain | Apr. 11, 1949 |